United States Patent [19]

Kitamura

[11] Patent Number: 5,044,486

[45] Date of Patent: Sep. 3, 1991

[54] PALLET MAGAZINE

[75] Inventor: Koichiro Kitamura, Takaoka, Japan

[73] Assignee: Kitamura Machinery Co., Ltd., Toyama, Japan

[21] Appl. No.: 360,481

[22] Filed: Jun. 2, 1989

[30] Foreign Application Priority Data

Jun. 7, 1988 [JP] Japan .................................. 63-138320

[51] Int. Cl.⁵ ............................................. B65G 37/00
[52] U.S. Cl. .............................. 198/346.1; 198/465.1; 29/33 P
[58] Field of Search ............... 198/346.1, 345.3, 465.1; 29/33 P, 563; 414/222, 223

[56] References Cited

U.S. PATENT DOCUMENTS 4,679,286  7/1987  Momoi et al. .................... 198/346.1

FOREIGN PATENT DOCUMENTS 132409  1/1985  European Pat. Off. .......... 198/346.1
34635  2/1989  Japan .............................. 198/465.1

Primary Examiner—Joseph E. Valenza
Attorney, Agent, or Firm—Ronald P. Kananen

[57] ABSTRACT

A pallet magazine for setting a plurality of pallets including a column and a plurality of swing units mounted on the column. A turntable as driven about a horizontal axis and including a plurality of rails for receiving the pallet. An indexing member securing the turntable at a desired position.

10 Claims, 7 Drawing Sheets

PALLET MAGAZINE

BACKGROUND OF THE INVENTION

This invention relates to a pallet magazine for storing a plurality of pallets.

In conventional pallet magazines a plurality of pallets are located in a horizontal plane, for instance, in a doughnut shape, wherein all of the pallets are simultaneously moved for indexing purpose.

Such conventional pallet magazines require a large setting floor, and a powerful and complicated drive means simultaneously moving all of the pallets.

BRIEF SUMMARY OF THE INVENTION

It is an object of this invention to provide a pallet magazine which requires a relatively small setting floor and has a simple structure.

According to this invention, a pallet magazine is provided, including a column' and a plurality of swing units mounted on the column on a same level. Each of the swing unit comprises a turntable having horizontal axes of rotation. The turntable has a plurality of rails, on which each pallet is detachably and slidably set, a drive means mounted on the column for rotating the turntable about the horizontal axes, and an indexing means for locking the turntable at a desired position after rotation by the drive means.

A pallet magazine according to this invention requires less setting floor space than conventional pallet magazines.

The pallet magazine according to this invention has a plurality of swing units, wherein only one swing unit is rotated when changing pallets. Thus, making the mechanism simple and easy to service.

As the works are successively indexed, the machined works turn sideways or face downwardly so that the cutting oil o chips adhered to the works fall downward, reducing the time for cleaning the works.

DETAILED DESCRIPTION OF THE PREFERRED EMBODIMENT

Figure 1:
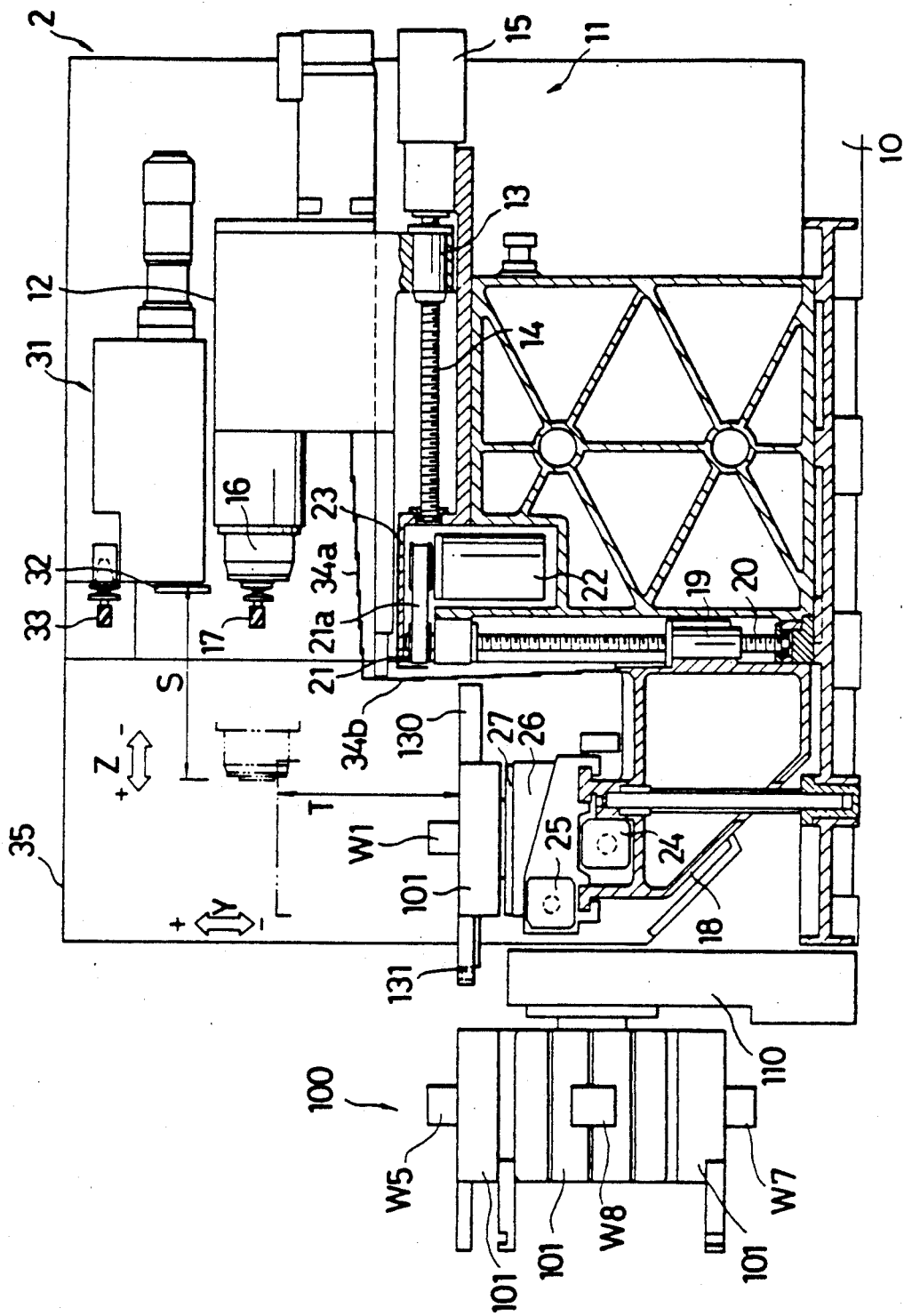
FIG. 1 is a sectional plan view, partially broken, showing a machine tool equipped with a pallet magazine according to this invention.

Referring to FIG. 1, a machine tool 2 includes a column 11 mounted on a base 10. A head 12 is slidably mounted on the upper portion of the column 11. A nut 13, secured to the head 12, engages a feed screw 14. The feed screw 14 is driven by a servomotor 15. When the servomotor 15 rotates, the head 12 is moved along a Z axis, as shown, within a stroke S. The head 12 is provided with a spindle 16 in which a tool 17 is set.

A knee 18 is slidably mounted on a front portion of the column 11. A nut 19 secured to the knee 18 engages a feed screw 20. The feed screw 20 is driven by a servomotor 22. A belt 21a is wrapped between a pulley 23, secured to an output shaft of the servomotor 22, and a pulley 21, secured to one end of the feed screw 20. When the servomotor 22 rotates, the knee 18 moves along a Y-axis, as shown, within a stroke T. The knee 18 is provided with servomotors 24, 25 and a table 26.

The table 26 has two elongated convex members 27 and a cylinder means 28 for clamping by a clamp plate 29 secured to a rod of the cylinder means 28. A pallet 101 may be set on the clamp plate 29.

Figure 2:
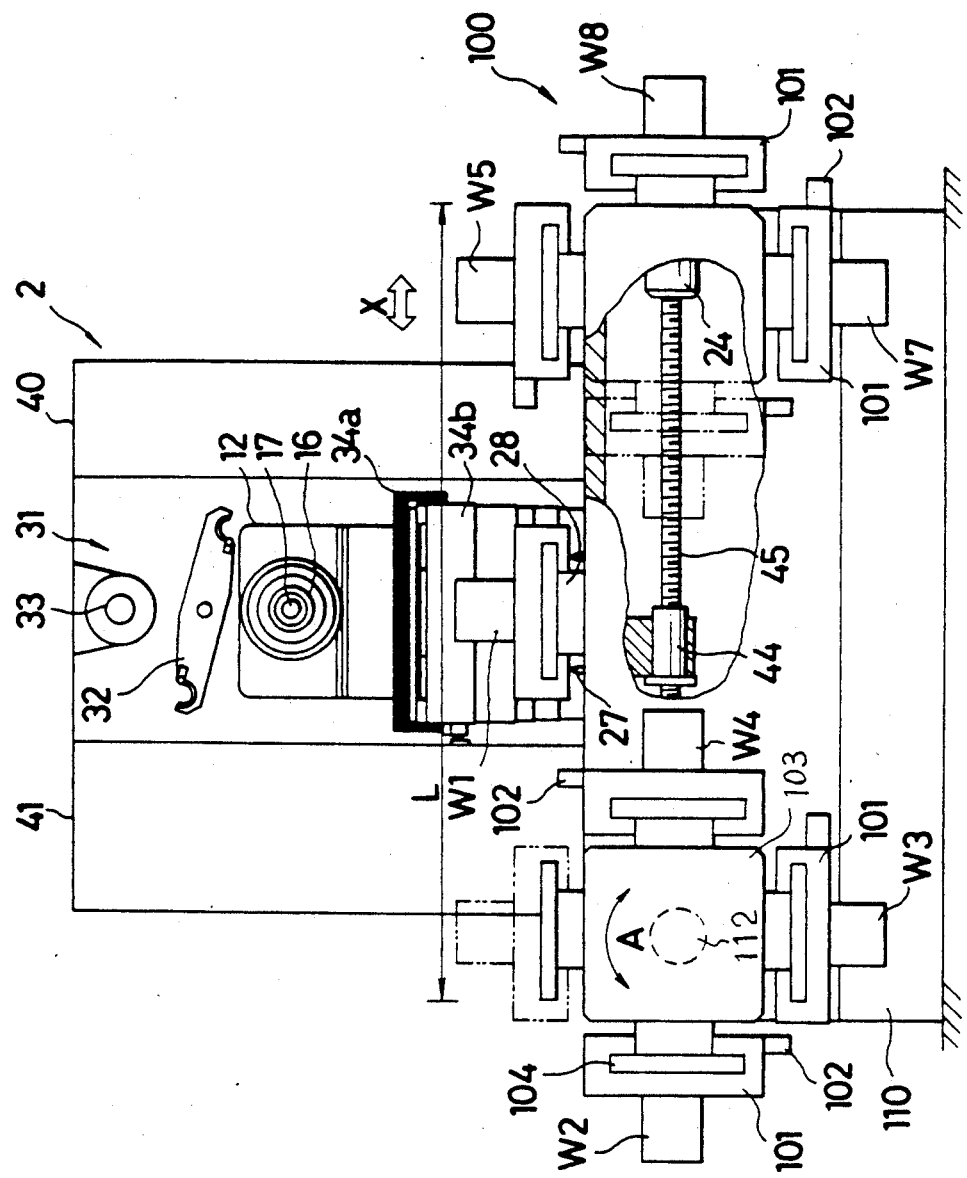
FIG. 2 is a side, partially-broken plan view showing the machine tool as shown in FIG. 1.
Figure 3:
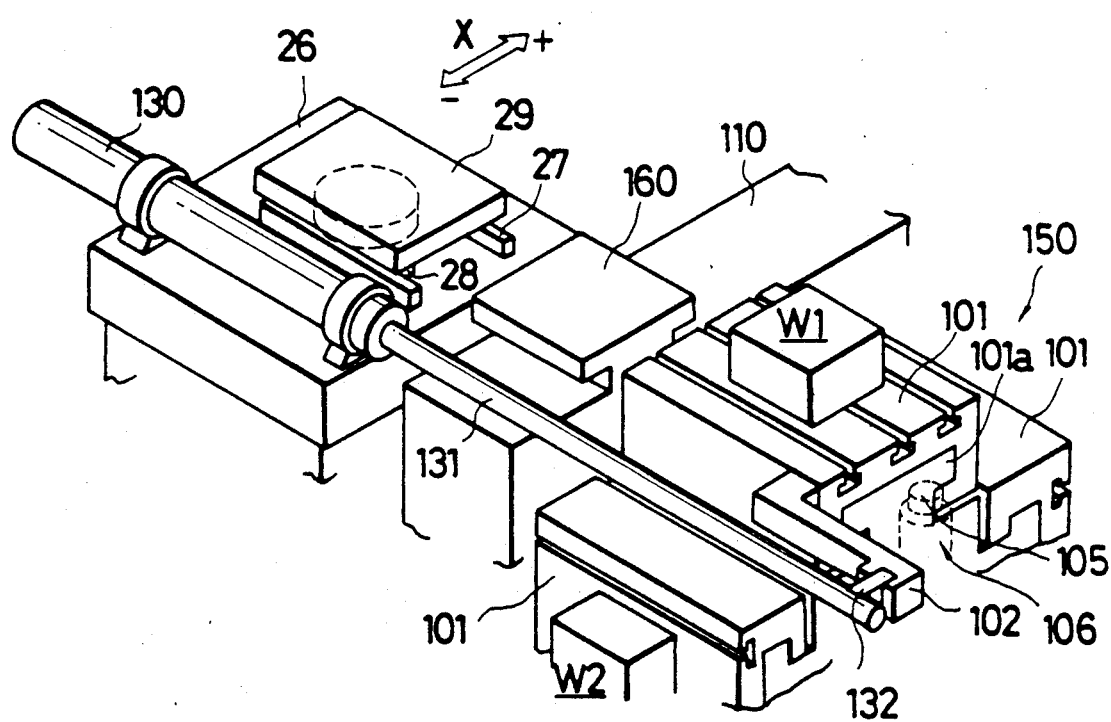
FIG. 3 is a perspective view showing a part of the pallet magazine and a table of the machine tool.
Figure 4:
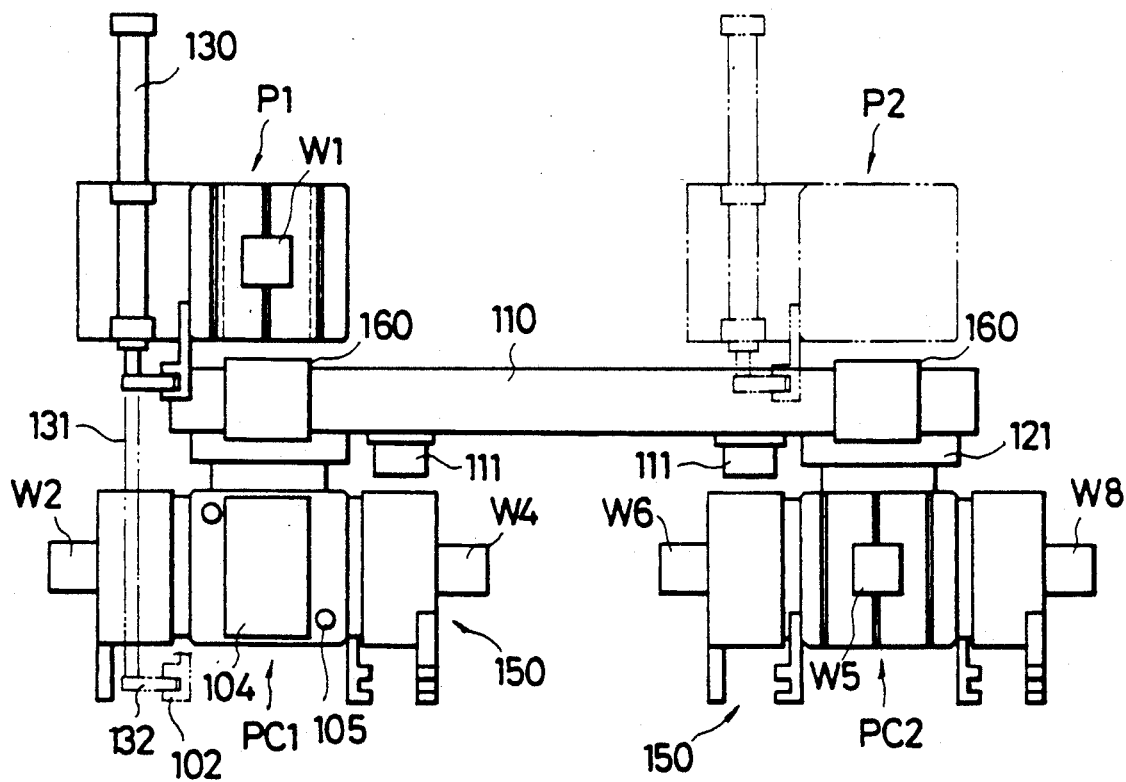
FIG. 4 is a top plan view showing the pallet magazine and the machine tool.

An automatic tool changer 31 is disposed above the head 12, as best seen in FIG. 2. The automatic tool changer 31 has a swing arm 32 for changing the tool 17 set in the spindle 16 for a new tool 33. The machine tool 2 has slide covers 34a, 34b and a splash guard 35.

As shown in FIG. 2, the machine tool 2 also includes a control panel 40 and a CNC device 41. A nut 44 secured to the table 26 engages a feed screw 45, which is driven by the servomotor 24. When the servomotor 24 rotates, the table 26 is moved along an X-axis, as shown, within a stroke L.

A pallet-carrying cylinder means 130 is mounted on the upper surface of the table 26. A rod. 131 of the cylinder means 130 has a hook member 132 fixed at the end of the rod 131.

Figure 5:
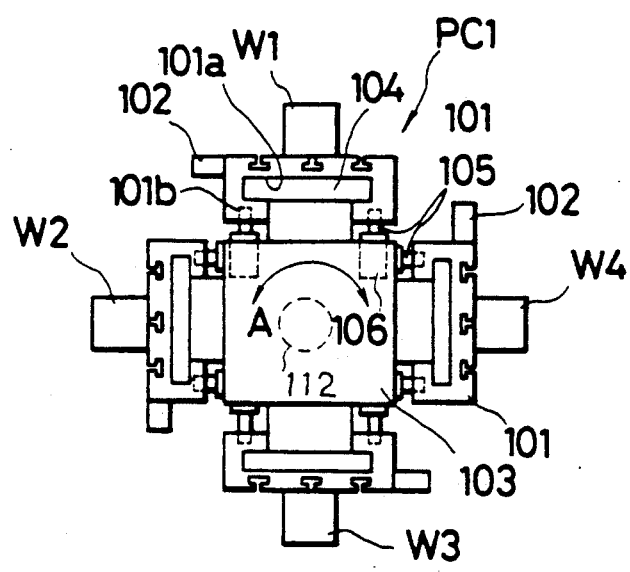
FIG. 5 is a plan view showing a swing unit of the pallet magazine.
Figure 6:
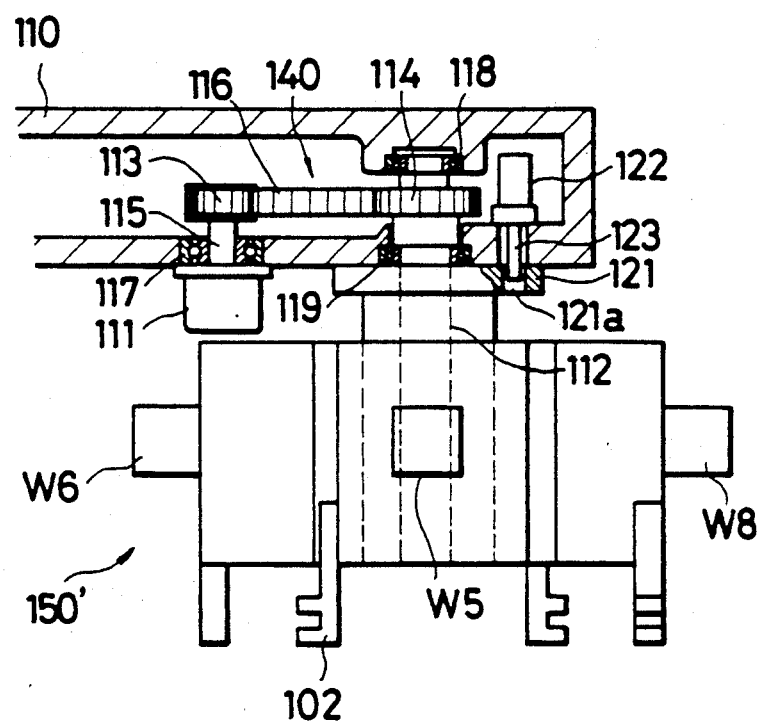
FIG. 6 is a sectional view showing a driving means of the swing unit.

In FIGS. 3 to 6, a pallet magazine 100 is shown having an elongated column 110. The column 110 is laid along the X-axis in the direction in which the table 26 moves. First and second swing units 150 are rotatably mounted on the column 110 on a same level so as to rotate about a horizontal shaft 112, as best seen in FIGS. 5 and 6. Two of the swing units 150 are aligned in the longitudinal direction of the column 110 along which the table 26 moves. Four pallets 101 are detachably set on each of the swing units 150. Thus, eight pallets may be set on the pallet magazine 100.

The swing unit 150 has a turntable 103, which consists of four flat faces. A rail 104 is fixed on each of the four faces. A pallet 101 may be detachably and slidably set on each of the rails 104. Therefore, each turntable 103 can receive four pallets 101.

Each pallet 101 has a groove 101a formed at a lower portion thereof. The shape of the groove 101a corresponds to the shape of the rail 104 in an engaging relationship, thereby allowing the pallet 101 to slide relative to the rail 104. The pallet 101 has a pallet hook 102 attached at the side face thereof. The pallet hook 102 engages the hook member 132 on the end of the rod 131.

A pair of cylinder means 106 are mounted on each of the faces of the turntable 103 in an diagonal arrangement. The cylinder means 106 has a locater pin 105 secured at the end of its rod. The cylinder means 106 is actuated by pressurized air or oil or the like. When the rod of the cylinder means 106 extends, the locater pin 105 is inserted into, or engaged with, the recess 101b formed in the lower portion of the pallet 101 so that the pallet 101 is locked to the turntable 103.

The swing unit 150 includes a drive means 140 for rotating the turntable 103. The turntable 103 is rotated by the drive means 140 so that a predetermined pallet 101 is indexed to the changing position PC1. The drive means 140 has an indexing motor 111. The indexing motor 111 is mounted on the column 110 and a gear 113 is keyed on the shaft of the indexing motor 111.

The turntable 103 has a horizontal shaft 112 secured at the center portion thereof. The turntable 103 rotates with the shaft 112, which is rotatably supported b bearings 118, 119 mounted in the column 110. A gear 114 is keyed on the shaft 112. A toothed belt 116 is wrapped between the gears 113 and 114. The drive force of the index motor 111 is transmitted to the shaft 112 by way of the gear 113, the toothed belt 116 and the gear 114.

The swing unit 150 is provided with an indexing means for locking the turntable 103 at a desired position after rotation by the drive means 140. The indexing means includes an indexing plate 121 and a cylinder means 122.

The shaft 112 has an indexing plate 121 attached to the intermediate portion thereof. The indexing plate 121 facing a sidewall of the column 110, has four indexing holes 121a formed therein for engaging an indexing pin 123.

A cylinder means 122 is mounted in the column 110 for locking the turntable 103 at a desired position. An end of the rod of the cylinder means 122 acts as the indexing pin 123. When the predetermined pallet 101 is indexed to the index position PC1 or PC2, the cylinder means 122 is actuated so that the indexing pin 123 is inserted into the aligned indexing hole 121a, thereby locking the pallet 101 into the desired position.

Two guide members 160 are affixed to the upper surface of the column 110 in alignment with the swing units 150, respectively. The shape of the guide member 160 corresponds to and engages with the shape of the groove 101a formed in the lower portion of the pallet 101. Thus, the pallet 101 slides longitudinally relative to the guide member 160. Each guide member 160 is aligned with the pallet 101 which is indexed to the pallet changing position PC1 or PC2, respectively. Therefore, the pallet 101 is smoothly transferred between the rail 101a of the swing unit 150 and the clamp plate 29 of the table 26 by way of the guide means 160.

The servomotors 15, 22, 24, 25, and the indexing motor 111 are controlled by the CNC device 41. The cylinder means 26, 122, 106, 103 are connected to a hydraulic or air power source (not shown). The cylinder means and the power source are also controlled by the CNC-device 41.

The pallet changing operation in the pallet magazine 100 is now described. Although, the operation as described is controlled by the CNC-device 41, it can be alternatively controlled by an operator through a keyboard.

Four of the pallets 101 are set on the one swing unit 150. The workpiece W1-W4 are respectively fixed on the pallets. In addition, four other pallets are set on the other swing unit 150. No pallet is placed on the table 26. The rod of the cylinder means 130 is in an initial contracted position.

First, the indexing motor 111 is operated so that the predetermined pallet is indexed to the pallet changing position PC1. The indexing pin 123 is inserted into the aligned indexing opening 121a of the indexing plate 121 for locking the turntable 103. This indexed pallet has the workpiece to be machined in the next step. Thereafter, the table 26 is moved in one direction along the X-axis locating in a position slightly left of the pallet-changing position P1. The cylinder means 130 is operated and the rod 131 is extended so that the hook member 132 is positioned in alignment with the pallet hook 102 of the pallet 101. The table 26 is then moved in the opposite direction and is placed at the pallet-changing position P1, whereby the hook 132 member engages the pallet hook 102. The cylinder means 106 is operated and the locater pin 105 is disengaged with the recess 101b so that the pallet can move relative to the rail 104. The cylinder means 130 is then operated to contract the rod 131 so that the pallet 101 is smoothly moved on the table 26 from the rail 104 of the turntable 103 by way of the guide member 160 in alignment therewith.

When the pallet 101 is accurately placed on the table 26, the rod of the clamp cylinder means 28 is contracted so that the pallet 101 is pressed against the convex member 27 for clamping. The hook member 132 still engages the pallet hook 102. In this manner, the pallet 101 is moved on the table 26 of the machine tool 2.

The workpiece W1 is machined by the machine tool in a predetermined manner. When the machining is finished, the pallet is returned to the pallet magazine from the table 26 by the following procedure.

First, the table is placed in the pallet-changing position P1. The rod of the clamp cylinder means 28 is extended for unclamping the pallet 101. The rod of the cylinder means 130 is then extended so that the pallet is moved toward the rail 104 of the swing unit 150. When the pallet is completely set on the rail 104, the cylinder means 106 is operated so that the locater pin 105 is inserted into the recess 101b for securing the pallet. Thereafter, the table 26 is moved in one-direction along the X-axis so that the hook member 132 disengages the pallet hook 102.

The cylinder means 122 is operated so that the indexing pin 123 is retracted from the indexing hole 121a of the indexing plate 121. The indexing motor 111 is operated to rotate the turntable 103 clockwise by 90 degrees as shown by the arrow A in FIGS. 2 and 5. Thereafter, the cylinder means 122 is so operated that the indexing pin 123 is inserted into the other aligned indexing hole 121a for locking the turntable. In this manner, the pallet 101, with the workpiece W2 to be machined in the next step, is indexed.

The pallet 101, containing the workpiece W2 is moved onto the table 26 of the machine tool in the aforesaid manner. The workpiece W2 is also machined. Thereafter the pallet 101, containing the workpiece W2, is returned to the pallet magazine 100.

The workpiece W3, W4 set in the swing unit 150, are machined in a similar manner.

When the pallet, containing the workpiece W2 or W3 is indexed to the changing position PC1, the workpiece W1 already machined turns sideways or faces downwardly. Therefore, cutting oil and chips adhering to the workpiece W1 easily fall downward by gravity, thus shortening the cleaning time for the work W1.

At the other swing unit 150, the four pallets having the workpieces W5-W8 are set, respectively. In this swing unit 150, the pallet is changed at the pallet changing position P2, PC2. When changing pallets, the pallet 101 is moved between the rail 104 and the clamp plate 29 by way of the other guide member 160 in aforemention manner.

In this embodiment, the table 26 of the machine tool 2 utilizes the pallet-carrying cylinder means 130 for moving the pallets.

However, the pallet magazine according to this invention, may be used in a machine tool which employs a pallet-changing apparatus. In this case, the cylinder means 130 mounted on the table 26 is omissible.

The pallet magazine may be provided with three or more swing units as well as only one swing unit.

Figure 7:
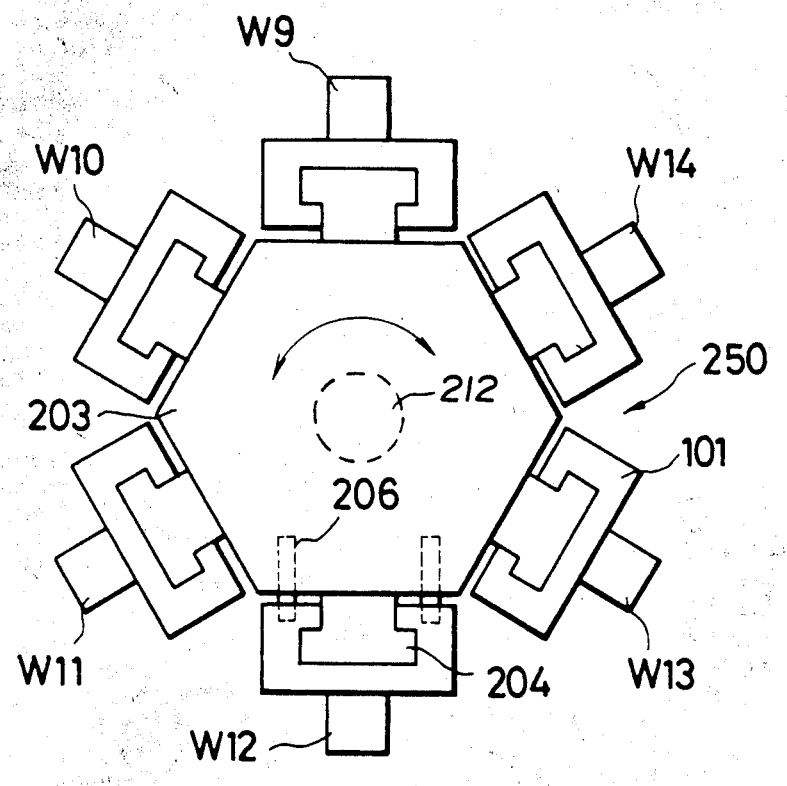
FIG. 7 is a side view showing another swing unit according to this invention.

Moreover, the swing unit may have five or more faces for receiving five or more pallets. For example, the swing unit shown in FIG. 7 has six faces for receiving six pallets. Other construction of the swing unit is similar to the abovementioned swing unit 150.

The swing base 103 may be cylindrical shaped rather than polygonal shape. In that instance, a plurality of rails 104, each for slidably receiving the pallet, are formed on the cylindrical surface.

We claim:

1. In a machine tool which includes a table (26) movable along a first direction (X) and a pallet magazine for setting a plurality of pallets (101) each having a first engaging means (102), the pallet magazine including a column (110), a swing unit (150) mounted on the column (110), and a pallet-carrying means (130) having a second engaging means (132) and mounted on the table (26) for carrying a pallet (101) between the table (26) and the swing unit (150), the swing unit (150) comprising:
   a turntable (103) having a horizontal axis of rotation and a plurality of rails (104) for slidably receiving a pallet (101);
   a driven means (140) mounted on the column (110) for rotating the turntable (103) about the horizontal axis; and
   an indexing means for securing the turntable at a desired position after rotation by the drive means (140),
   wherein the first and second engaging means (102 and 130) can be engaged by moving the table (26) in the first direction (X) and then the pallet (101) can be carried from the swing unit (150) to the table (26) by actuating the pallet-carrying means (130).

2. The pallet magazine according to claim 1, wherein the indexing means include an indexing plate (121) having a plurality of indexing holes (121a), and a cylinder means (122) having an indexing pin (123) for engaging one of the indexing holes.

3. The pallet magazine according to claim 1, wherein a plurality of cylinder means (106) are mounted on the turntable (103) for locking the pallet (101) onto a rail (104), the cylinder means (106) having a locater pin (105) for engaging a recess (101b) formed in the pallet (101).

4. The pallet magazine according to claim 1, wherein the column (110) has a guide rail (160) fixed on the upper surface thereof for guiding a pallet (101).

5. The pallet magazine according to claim 1, wherein the drive means (140) includes an index motor (111).

6. The pallet magazine according to claim 1, wherein the turntable (103) is cubic-shaped having four faces, each of the faces having the rail (104) on which the pallet (101) is detachably and slidably set, and wherein a pair of the cylinder means (106) are mounted on each of the faces in diagonal arrangement.

7. The pallet magazine according to claim 1, wherein the pallet-carrying means is a cylinder means.

8. The pallet magazine according to claim 7, wherein the first engaging means is a pallet hook attached to a side face of the pallet and the second engaging means is a hook member attached to a rod of the cylinder means.

9. In a machine tool which includes a table movable along a first direction and a pallet magazine for setting a plurality of pallets (101) each having a first engaging means (102), the pallet magazine including an elongated column (110) arranged along the first direction, a plurality of swing units (150) mounted on the column (110) and aligned along the longitudinal direction of the column, and a pallet-carrying means (130) having a second engaging means (132) and mounted on the table for carrying a pallet (101) between the table and one of the swing units (150), each of the swing units (150) comprising:
   a turntable (103 having a horizontal axis of rotation and a plurality of rails (104) for slidably receiving a pallet (101);
   a drive means (140) mounted on the column (110) for rotating the turntable (103) about the horizontal xis; and
   an indexing means for securing the turntable at a desired position after rotation by the drive means (14).

10. The pallet magazine according to claim 9, wherein the first and second engaging means (102 and 130) can be engaged by moving the table (26) in the first direction (X) and then the pallet (101) can be carried from the swing unit (150) to the table (26) by actuating the pallet-carrying means (130).

* * * * *